US012757834B2

(12) United States Patent

Persoli

(10) Patent No.: US 12,757,834 B2
(45) Date of Patent: Oct. 13, 2026

(54) GUIDE VANE FOR SUGARCANE HARVESTER EXTRACTOR

(71) Applicant: AGCO DO BRASIL SOLUÇÕES AGRÍCOLAS LTDA, Ribeireo Preto (BR)

(72) Inventor: Fabio Luiz Spessoto Persoli, Canoas (BR)

(73) Assignee: AGCO do Brasil Soluções Agrícolas Ltda., Riveirao Preto (BR)

(*) Notice: Subject to any disclaimer, the term of this patent is extended or adjusted under 35 U.S.C. 154(b) by 576 days.

(21) Appl. No.: 18/257,876

(22) PCT Filed: Oct. 12, 2021

(86) PCT No.: PCT/IB2021/059313
§ 371 (c)(1),
(2) Date: Jun. 15, 2023

(87) PCT Pub. No.: WO2022/136947
PCT Pub. Date: Jun. 30, 2022

(65) Prior Publication Data

US 2024/0049641 A1 Feb. 15, 2024

(30) Foreign Application Priority Data

Dec. 21, 2020 (GB) ...................................... 2020257

(51) Int. Cl.
*A01D 45/10* (2006.01)
*A01D 43/08* (2006.01)
*A01F 12/48* (2006.01)

(52) U.S. Cl.
CPC ............. *A01D 45/10* (2013.01); *A01D 43/08* (2013.01); *A01F 12/48* (2013.01)

(58) Field of Classification Search
CPC ........ A01D 45/10; A01D 43/08; A01D 41/12; A01D 61/00; A01D 61/002; A01F 12/48; A01F 12/44
See application file for complete search history.

(56) References Cited

U.S. PATENT DOCUMENTS

| | | | | |
|---|---|---|---|---|
| 3,830,046 | A * | 8/1974 | Rollitt .................... | A01D 45/10 56/16.5 |
| 3,958,397 | A | 5/1976 | Stiff | |
| 4,702,423 | A | 10/1987 | Cerveira de Mello Ribeiro Pinto | |
| 4,944,654 | A * | 7/1990 | Chou ...................... | F24F 13/08 165/126 |

(Continued)

FOREIGN PATENT DOCUMENTS

| | | | |
|---|---|---|---|
| AU | 3123471 | A | 1/1973 |
| WO | 2020194330 | A1 | 10/2020 |

OTHER PUBLICATIONS

UK Intellectual Property Office, Search report for related UK Application No. GB2020257.8, dated May 20, 2021, 4 pages.

(Continued)

*Primary Examiner* — William D Hutton, Jr.
*Assistant Examiner* — Jose A. Martinez

(57) ABSTRACT

An extractor for a sugarcane harvester, including a housing having a volume and an inlet and an outlet, a fan assembly disposed within the volume, and a guide vane disposed between the fan assembly and the outlet, the guide vane arranged to divide the volume.

8 Claims, 4 Drawing Sheets

(56) References Cited

U.S. PATENT DOCUMENTS

| | | | | |
|---|---|---|---|---|
| 10,485,170 | B2 * | 11/2019 | Nicora | B07B 4/025 |
| 11,339,798 | B2 * | 5/2022 | Bielicki | F04D 29/422 |
| 2015/0327438 | A1 * | 11/2015 | Cazenave | A01D 45/10 56/51 |
| 2017/0251601 | A1 | 9/2017 | Dugas et al. | |
| 2018/0116114 | A1 | 5/2018 | Craig et al. | |
| 2019/0082600 | A1 | 3/2019 | Nicora et al. | |
| 2021/0227751 | A1 * | 7/2021 | Fattepur | A01D 45/10 |
| 2023/0120208 | A1 * | 4/2023 | Hansen | A01D 43/08 56/10.1 |

OTHER PUBLICATIONS

European Patent Office, International Search Report related to International Patent Application No. PCT/IB2021/059313 mail date Dec. 22, 2021, 13 pages.

* cited by examiner

GUIDE VANE FOR SUGARCANE HARVESTER EXTRACTOR

CROSS REFERENCE TO RELATED APPLICATION

This application is a national stage application under 35 U.S.C. 371 of International Patent Application No. PCT/IB2021/059313, filed on Dec. 12, 2021, claims the benefit of U.K. Application No. 2020257.8, filed Dec. 21, 2020, both of which are hereby incorporated by reference in their entirety.

TECHNICAL FIELD

The present disclosure is generally related to sugar cane harvesters and, more particularly, extractors for sugarcane harvesters.

BACKGROUND

Sugarcane harvesters comprise agricultural equipment used to harvest sugarcane crop. In essence, sugarcane harvesters strip off the leaves, cut sugarcane stalks close to the base, and cut the sugarcane into segments or billets that form part of a harvested crop flow that is cleaned of extraneous material (e.g., straw, dirt, etc.) and stored on-board and/or discharged to an accompanying trailer or truck.

The cleaning of the harvested crop flow is typically performed at one or more extractors that are located downstream of the chopping system that chops the sugarcane into billets. These extractors are each typically equipped with a fan assembly and powered using a hydraulic motor, the latter drawing machine power. Hence, inefficiencies in operating the fan assemblies of these extractors should be addressed along with other subsystem inefficiencies in an effort to make machines more energy efficient.

BRIEF DESCRIPTION OF THE DRAWINGS

Many aspects of certain embodiments of an extractor system can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
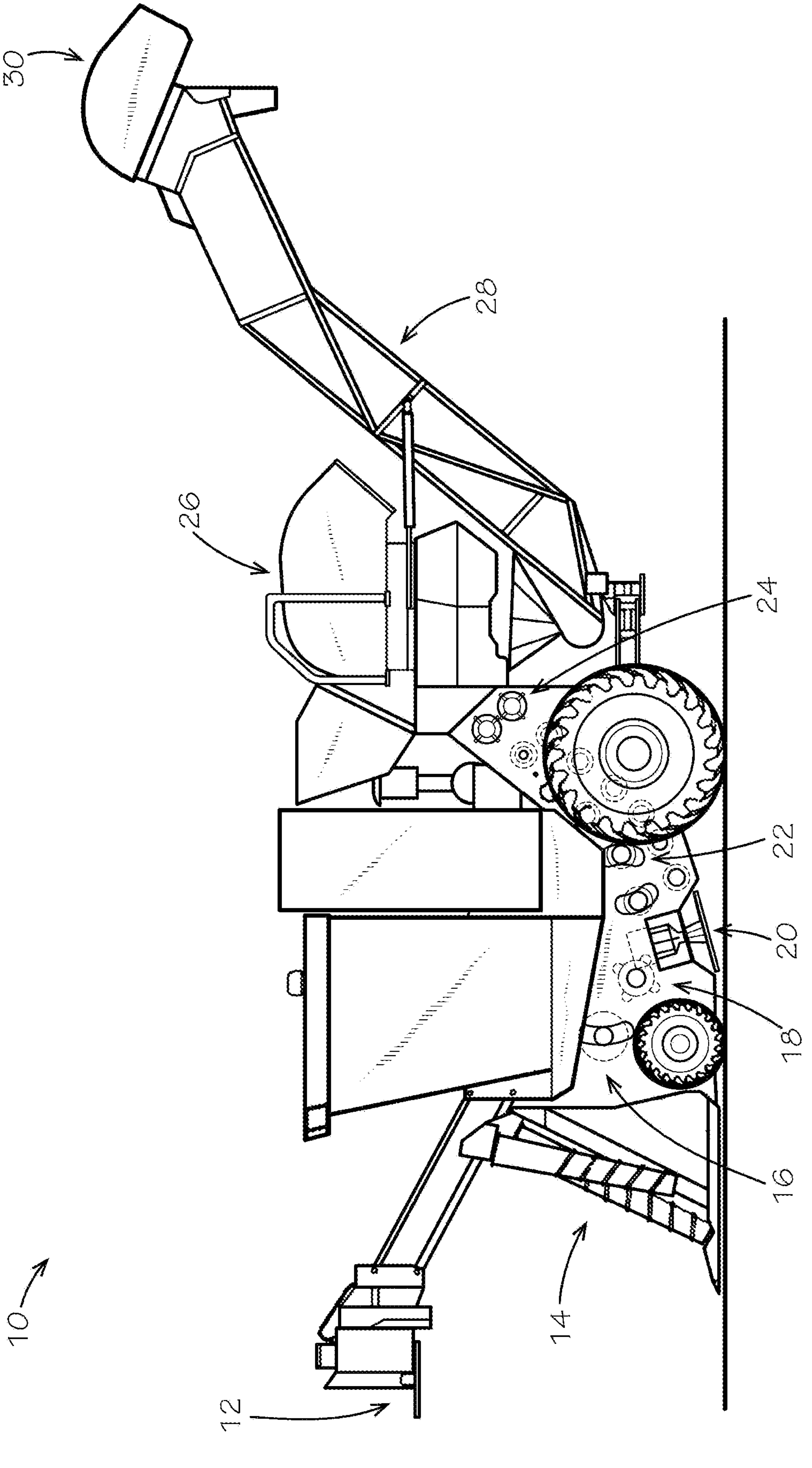
FIG. 1 is a schematic diagram that illustrates an example sugarcane harvester in which an embodiment of an extractor system may be used.

In one embodiment, an extractor for a sugarcane harvester, comprising: a housing having a volume and an inlet and an outlet; a fan assembly disposed within the volume; and a guide vane disposed between the fan assembly and the outlet, the guide vane arranged to divide the volume.

Detailed Description

Certain embodiments of an extractor system and method for a sugarcane harvester are disclosed that cleans or filters harvested material flow in an efficient way. In one embodiment, the extractor system comprises a guide vane that is disposed within an outlet volume of an extractor housing, the guide vane dividing the outlet volume into two volumes that provides a more even air flow while reducing turbulence in the outlet volume. With a more even air flow, operation of a fan assembly used in the extractor system is more efficient, providing savings in terms of absorbed power drawn by the fan assembly.

Digressing briefly, existing extractor systems draw air and other material through a substantially uniform volume, where in the outlet volume, turbulence is common, which causes increased consumption of power on the fan assembly used therein. In contrast, certain embodiments of an extractor system may be used in one or more of the extractors of a sugarcane harvester to divide the drawn air flow and reduce the turbulences in the outlet volume.

Having summarized certain features of an extractor system, reference will now be made in detail to the description of an extractor system as illustrated in the drawings. While an example extractor system will be described in connection with these drawings, there is no intent to limit it to the embodiment or embodiments disclosed herein. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, “front”, “rear”, “left” and “right”, are made as viewed from the rear of the sugarcane harvester looking forwardly.

FIG. 1 is a schematic diagram that illustrates a sugarcane harvester 10 in which an embodiment of an extractor system is used. The sugarcane harvester 10 comprises a top cutter 12, a gathering system 14 (e.g., crop divider), knock down rollers 16, finned rollers 18, base cutters 20, a feed train 22, a chopper system 24, a primary extractor 26, an elevator 28, and a secondary extractor 30. In some embodiments, the sugarcane harvester 10 may comprise a temporary harvested crop storage. Note that there may be variations in the quantity or type of components from one manufacturer to another, and hence such variations are contemplated to be within the scope of the disclosure. In general, the top cutter 12 cuts the leaves, and the gathering system 14 separates the rows of sugarcane. The knock down rollers 16 are used to prepare the crop to be cut, and in conjunction with the finned rollers 18, push the sugarcane into a position where the base cutters 20 cut the sugarcane proximal to the ground surface (e.g., 1-2 inches from the soil surface). The feed train 22 is used to transport the cut sugarcane to the chopper system 24. The chopper system 24 cuts the sugarcane into billets, which are cleaned or filtered of extraneous or non-essential material (e.g., straw, dirt, etc.) by the primary extractor 26 and also routed by the elevator 28 where the harvested crop is further cleaned by the secondary extractor 30 before being stored and/or discharged to an accompanying vehicle (e.g., truck, trailer, etc.). Note that in some embodiments, one or more components may be omitted. For instance, in some embodiments, one of the extractors 26, 30 may be omitted. As sugarcane harvesting operations are known in general, further description of the same is omitted here for brevity.

Figure 2A:
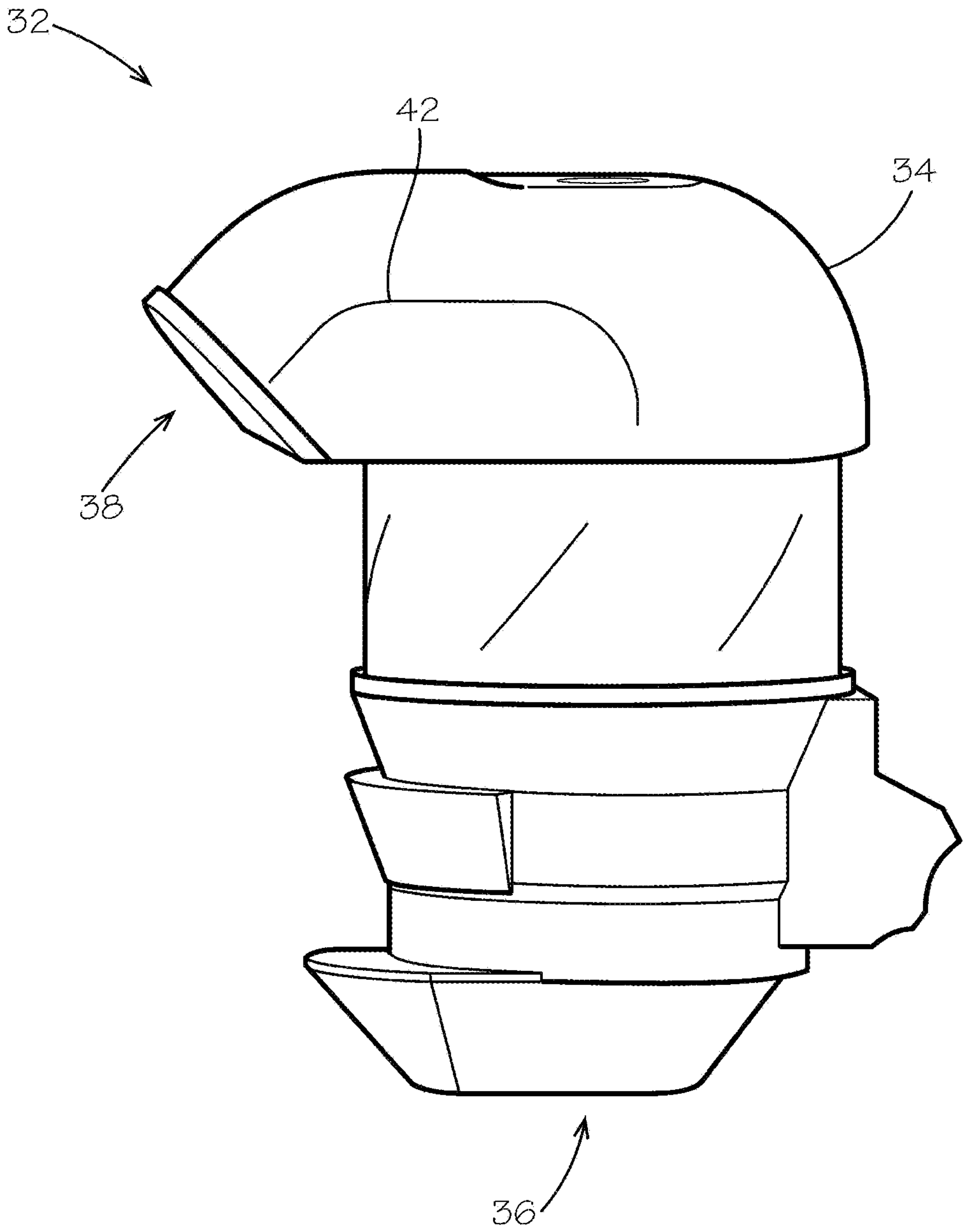
FIGS. 2A-2B are schematic diagrams that illustrate in side elevation, partial cutaway views an embodiment of an extractor system.
Figure 2B:
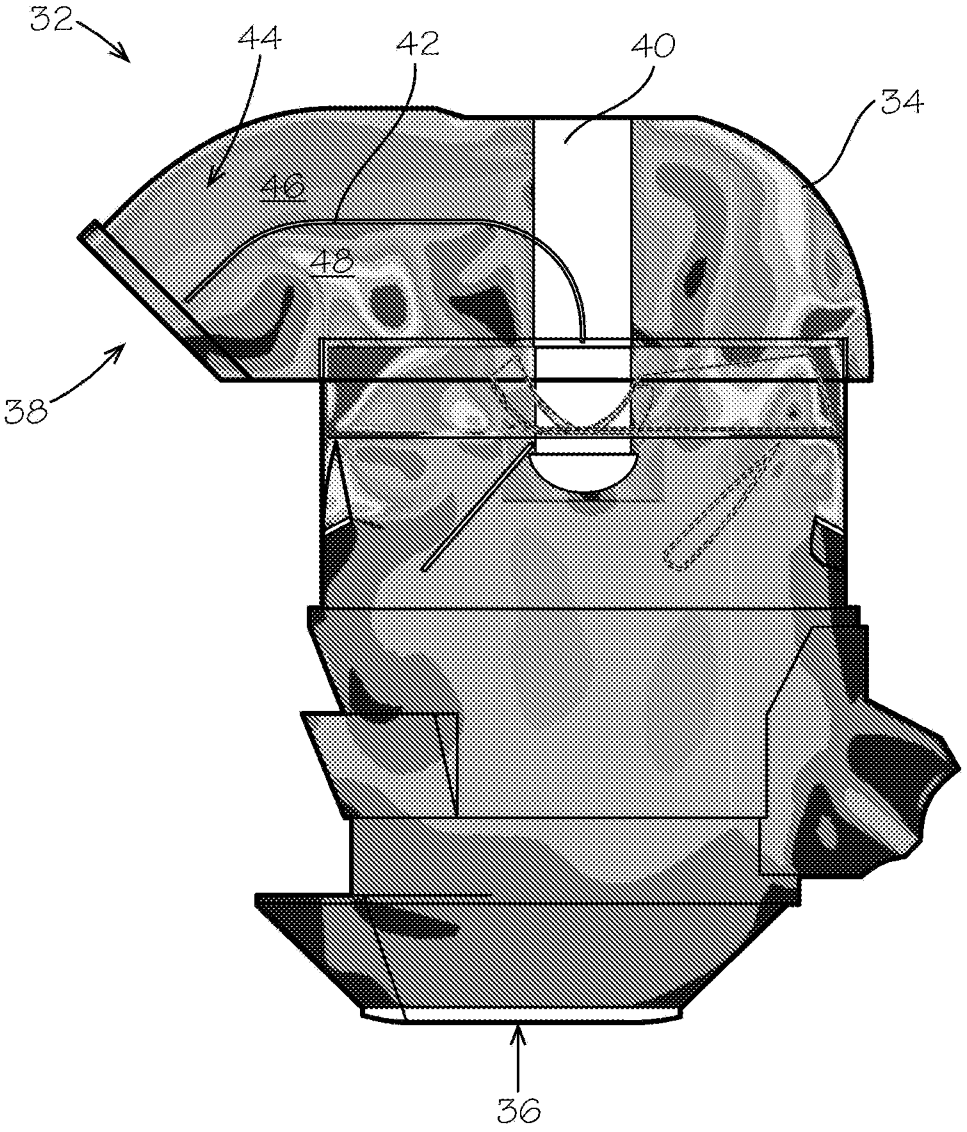

Referring now to FIGS. 2A-2B, shown in side elevation, partial cutaway views, is an embodiment of an extractor system 32. The extractor system 32 may serve as the primary extractor 26 or the secondary extractor 30 or used as both in some embodiments. In one embodiment, the extractor system 32 comprises a housing 34 having an inlet 36 and an outlet 38. The housing 34 may comprise one or more attachable housing assemblies. As best shown in FIG. 2B, the extractor system 32 further comprises a fan assembly 40 and a guide vane 42. In one embodiment, the fan assembly 40 is disposed in an upper portion of the housing 34, and comprises a shaft, a blade or propeller or prop assembly (e.g., four props or blades), and a motor (e.g., a hydraulic motor, though other motive forces including electric and/or magnetic may be used in some embodiments). The guide vane 42 (also shown in partial cutaway in FIG. 2A) comprises a flat sheet of material that is curved in shape, the curved shape essentially similar in profile to the curved shape of the outlet portion of the housing 34. The guide vane 42 may be comprised of a wear resistant material, including metal (e.g., Hardox®, among other types of material).

The guide vane 42 divides a volume 44 of the housing located between a hub of the fan assembly 40 and the outlet 38. In one embodiment, the guide vane 42 divides the volume 44 into a top or upper volume 46 and a bottom or lower volume 48, the guide vane 42 extending substantially between opposing side interior surfaces of the housing 34, though in some embodiments, may be in contact with the opposing side interior surfaces and in some embodiments may leave a gap of one or more inches between the edge of the guide vane 42 and the opposing side interior surfaces of the housing 34. In some embodiments, the guide vane 42 may divide the volume 44 into a left and right volume, or divide the volume 44 according to other volume split configurations (e.g., angled) in some embodiments. In one embodiment, the guide vane 42 is replaceably mounted to the fan assembly 40. For instance, the guide vane 42 may be coupled to the fan assembly 40 using a flange that is mounted to the shaft of the fan assembly 40. In some embodiments, the guide vane 42 is fixedly attached (e.g., welded) to the fan assembly and the interior surfaces of the housing 34. Other types and/or locations for attachment of the guide vane 42 may be used in some embodiments. In some embodiments, the guide vane 42 may be comprised of plural (e.g., two) parts that may be removable/replaceable in some embodiments.

In one embodiment, air flow drawn by fan operation influences or draws material from the harvested crop flow from the chopper system 24 (and in the case of the second extractor 30, from the elevator 28) into the extractor system 32, the material drawn through the inlet 36, past the fan assembly 40 and into the divided top (or upper) volume 46 and bottom (or lower) 48 volume of the upper housing 34 or outlet volume 44, enabling an even distribution of the drawn material and air flow through the outlet volume 44 of the housing 34 and out the outlet 38. Through the even air flow distribution enabled by the guide vane 42, turbulence is avoided or mitigated and the fan assembly 40 works more efficiently, which enables a savings in terms of absorbed power of the fan assembly 40.

Figure 3:
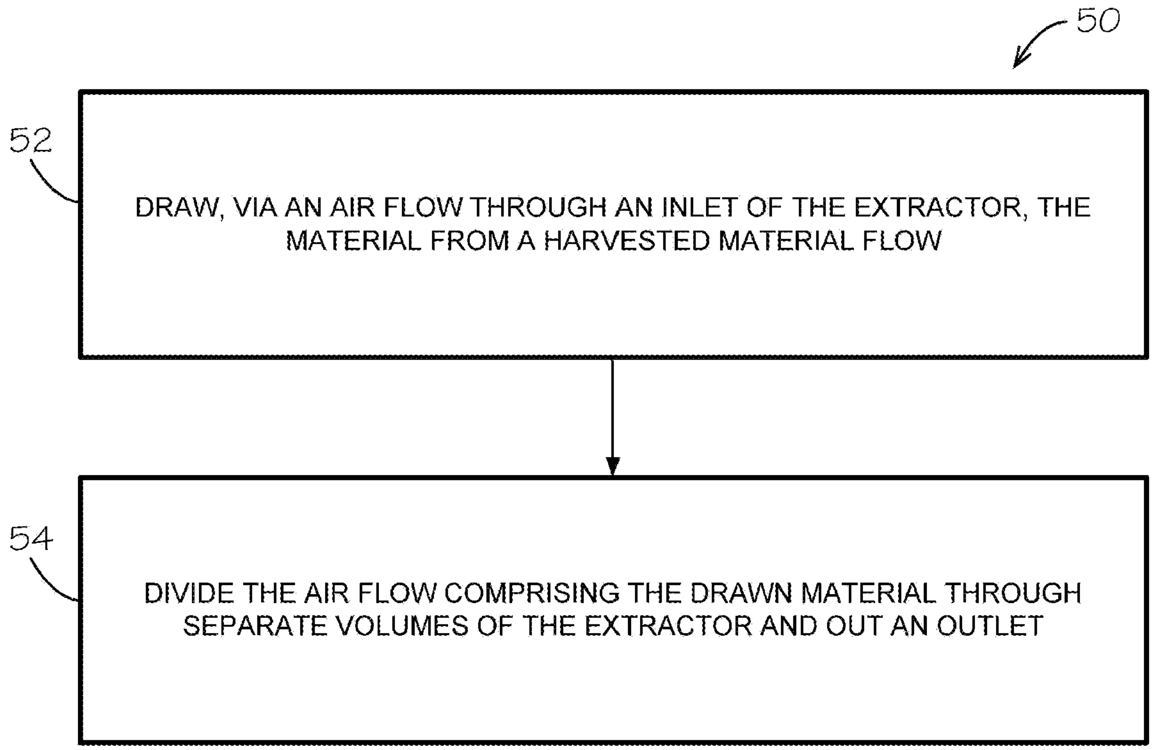
FIG. 3 is a flow diagram that illustrates an embodiment of an example extractor method.

Having described certain embodiments of an extractor system 32, it should be appreciated by one having ordinary skill in the art in the context of the present disclosure that one embodiment of an example method for extracting material from harvested sugarcane and implemented in an extractor of a sugarcane harvester, denoted in FIG. 3 as denoted as method 50, comprises, drawing, via an air flow through an inlet of the extractor, the material from a harvested material flow (52); dividing the air flow comprising the drawn material through separate volumes of the extractor and out an outlet (54).

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. An extractor for a sugarcane harvester, comprising:
- a housing having a volume and an inlet and an outlet;
- a fan assembly disposed within the volume;
- a guide vane disposed between the fan assembly and the outlet, the guide vane arranged to divide the volume into two volumes and extending from the fan assembly to the outlet such that only air from the fan assembly passes through the two volumes, and
- a flange coupled to a shaft of the fan assembly, the flange replaceably coupling the guide vane to the shaft.

2. The extractor of claim 1, wherein in the guide vane is arranged to divide the volume into a top volume and a bottom volume.

3. The extractor of claim 1, wherein the guide vane comprises a flat sheet of material with a curved geometry that approximates a side profile of the housing between the fan assembly and the outlet.

4. The extractor of claim 3, wherein the flat sheet of material is comprised of a wear-resistant material.

5. A sugarcane harvester, comprising:
- a chopper system configured to chop harvested material;
- a primary extractor;
- an elevator; and
- a secondary extractor, wherein the primary extractor is configured to filter harvested material from the chopper system and the secondary extractor is configured to filter material from the elevator, each of the primary and secondary extractors comprising:
  - a housing having a volume and an inlet and an outlet;
  - a fan assembly disposed within the volume;
  - a guide vane disposed between the fan assembly and the outlet, the guide vane arranged to divide the volume into two volumes and extending from the fan assembly to the outlet such that only air from the fan assembly passes through the two volumes and
  - a flange coupled to a shaft of the fan assembly, the flange replaceably coupling the guide vane to the shaft.

6. The sugarcane harvester of claim 5, wherein in the guide vane is arranged to divide the volume into a top volume and a bottom volume.

7. The sugarcane harvester of claim 5, wherein the guide vane comprises a flat sheet of material with a curved geometry that approximates a side profile of the housing between the fan assembly and the outlet.

8. The sugarcane harvester of claim 7, wherein the flat sheet of material is comprised of a wear-resistant material.

* * * * *